US012093151B2

(12) United States Patent
Tan et al.

(10) Patent No.: US 12,093,151 B2
(45) Date of Patent: Sep. 17, 2024

(54) MANAGING REFERENCE SNAPSHOTS ACROSS MULTIPLE SITES FOR EFFICIENT FAILOVER/FAILBACK

(71) Applicant: Nutanix, Inc., San Jose, CA (US)

(72) Inventors: Kai Tan, Cary, NC (US); Karthikeyan Vaideswaran, Morrisville, NC (US); Pranab Patnaik, Cary, NC (US); Ramya Uthamarajan, Cary, NC (US)

(73) Assignee: Nutanix, Inc., San Jose, CA (US)

( * ) Notice: Subject to any disclaimer, the term of this patent is extended or adjusted under 35 U.S.C. 154(b) by 60 days.

(21) Appl. No.: 17/977,248

(22) Filed: Oct. 31, 2022

(65) Prior Publication Data

US 2024/0143460 A1 May 2, 2024

(51) Int. Cl.
*G06F 11/20* (2006.01)
*G06F 11/14* (2006.01)

(52) U.S. Cl.
CPC ...... *G06F 11/2025* (2013.01); *G06F 11/1461* (2013.01); *G06F 11/1464* (2013.01); *G06F 2201/84* (2013.01)

(58) Field of Classification Search
CPC ............. G06F 11/2025; G06F 11/1461; G06F 11/1464; G06F 2201/84
USPC ....................................................... 714/4.11
See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,850,130 B1 | 9/2014 | Aron et al. | |
| 8,863,124 B1 | 10/2014 | Aron et al. | |
| 9,009,106 B1 | 4/2015 | Aron et al. | |
| 9,069,708 B2 | 6/2015 | Gill et al. | |
| 9,336,132 B1 | 5/2016 | Aron et al. | |
| 9,652,265 B1 | 5/2017 | Narayanasamy et al. | |
| 9,747,287 B1 | 8/2017 | Bhardwaj et al. | |

(Continued)

OTHER PUBLICATIONS

Citrix XenDesktop 7.1 on Microsoft Hyper-V Server 2012 R2 on Nutanix Virtual Computing Platform Solution Design Citrix Validated Solutions, Jun. 25, 2014, 95 pages.

(Continued)

*Primary Examiner* — Yair Leibovich
(74) *Attorney, Agent, or Firm* — Cesari and McKenna, LLP (57) ABSTRACT

A technique provides network efficient data failover by explicitly protecting one or more common snapshot references at sites of a multi-site data replication environment to improve granularity of control of recovery point objectives (RPO) for data across the sites. A common snapshot reference or recovery point (RP) ensures that, in the event of failure to a site, data designated for failover may be quickly protected by replicating only small incremental changes to the RP so as to maintain RPO requirements across the sites. Illustratively, the technique enhances and extends a disaster recovery (DR) application programming interface (API) protocol through an extension that defines and applies a tag to the RP, wherein the tag enables protection and/or preservation of the RP by ensuring that the sites honor the tag applied to the RP. The tag essentially functions as an advisory lock for the RP that is shared among the sites to prevent deletion of the RP at the sites throughout the duration of the lock.

27 Claims, 6 Drawing Sheets

(56) References Cited

U.S. PATENT DOCUMENTS

| | | |
|---|---|---|
| 9,772,866 B1 | 9/2017 | Aron et al. |
| 11,436,097 B1 | 9/2022 | Kumar et al. |
| 11,868,218 B1* | 1/2024 | Goren ................ G06F 11/1662 |
| 2014/0282470 A1* | 9/2014 | Buga ........................ G06F 8/65 717/170 |
| 2022/0309010 A1 | 9/2022 | Jiang et al. |
| 2022/0374316 A1 | 11/2022 | Kumar |
| 2023/0080691 A1 | 3/2023 | Gupta et al. |
| 2023/0205653 A1 | 6/2023 | Gupta et al. |

OTHER PUBLICATIONS

VMware Manual—vCenter Server and Host Management, Update 1, VMware vSphere 7.0, VMware ES, Xi 7.0, vCenter Server 7.0, Modified on Nov. 25, 2020, 203 pages.

Cano, Ignacio, "Curator: Self-Managing Storage for Enterprise Clusters" University of Washington; published Mar. 2017; pp. all.

Poitras, Steven "The Nutanix Bible" from http://stevenpoitras.com/the-nutanix-bible/ Oct. 15, 2013 (Publication date based on indicated capture date by Archive.org first publication date unknown) pp. all.

Poitras, Steven "The Nutanix Bible" from https://nutanixbible.com/ Sep. 2020 pp. all.

* cited by examiner

MANAGING REFERENCE SNAPSHOTS ACROSS MULTIPLE SITES FOR EFFICIENT FAILOVER/FAILBACK

BACKGROUND

Technical Field

The present disclosure relates to data failover and, more specifically, to data failover using snapshots in a multi-site data replication environment.

Background Information

Data failover generally involves copying or replicating data among multiple datacenters to enable continued operation of data processing operations in a multi-site data replication environment, such as backup and disaster recovery. The multi-site data replication environment may include two or more datacenters, i.e., sites, which are often geographically separated by relatively large distances and connected over a communication network, e.g., a wide area network. For example, data at a local datacenter (primary site) may be replicated over the network to one or more remote datacenters located at geographically separated distances to ensure continued data processing operations in the event of a failure of the primary site.

Data may be replicated between the sites such that each update to the data at the primary site is copied to the remote sites. However, copying of each data update typically results in constant transfer of data over networks spanning geographical areas in the multi-site data replication environment, which may be costly and expensive, as the network is often poorly utilized leading to needless replication with commensurate bandwidth reduction and often a failure to meet (satisfy) recovery point objective (RPO) thresholds/requirements. Typical approaches have involved retention of frequent common snapshots between sites so as to satisfy RPO for data across the sites; however those approaches also often suffer from retaining more snapshots than necessary (i.e., resulting in more data than necessary transferred between sites) to ensure availability of a common snapshot between the sites.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to a technique configured to provide network efficient data failover by explicitly protecting one or more common snapshot references at sites of a multi-site data replication environment to improve granularity of control of recovery point objectives (RPO) for data across the sites. A common snapshot reference or recovery point (RP) is ensured (i.e., protected) so that, in the event of failure to a site, data designated for failover may be quickly protected by replicating only small incremental changes to the RP so as to maintain RPO requirements across the sites. In this manner, only a single snapshot need be retained and maintained at each of the multiple sites as the snapshot (i.e., RP) is marked as protected using ownership tags to prevent modification such as accidental removal or deletion. Illustratively to this end, the technique enhances a disaster recovery (DR) application programming interface (API) protocol through an extension that defines and applies a site ownership tag (i.e., additional metadata as a lock to control modification such as removal/deletion) to the RP (e.g., snapshot), wherein the tag enables protection and/or preservation of the RP that is ensured by enforcing adherence to the site ownership tag at the sites for the RP. The tag essentially functions as an advisory lock for the RP (e.g., a resource) that is shared among the sites to prevent deletion of the RP at the sites throughout the duration of the lock. As a result, the RP is retained and remains available at each site for failover to any other site.

DESCRIPTION

Figure 1:
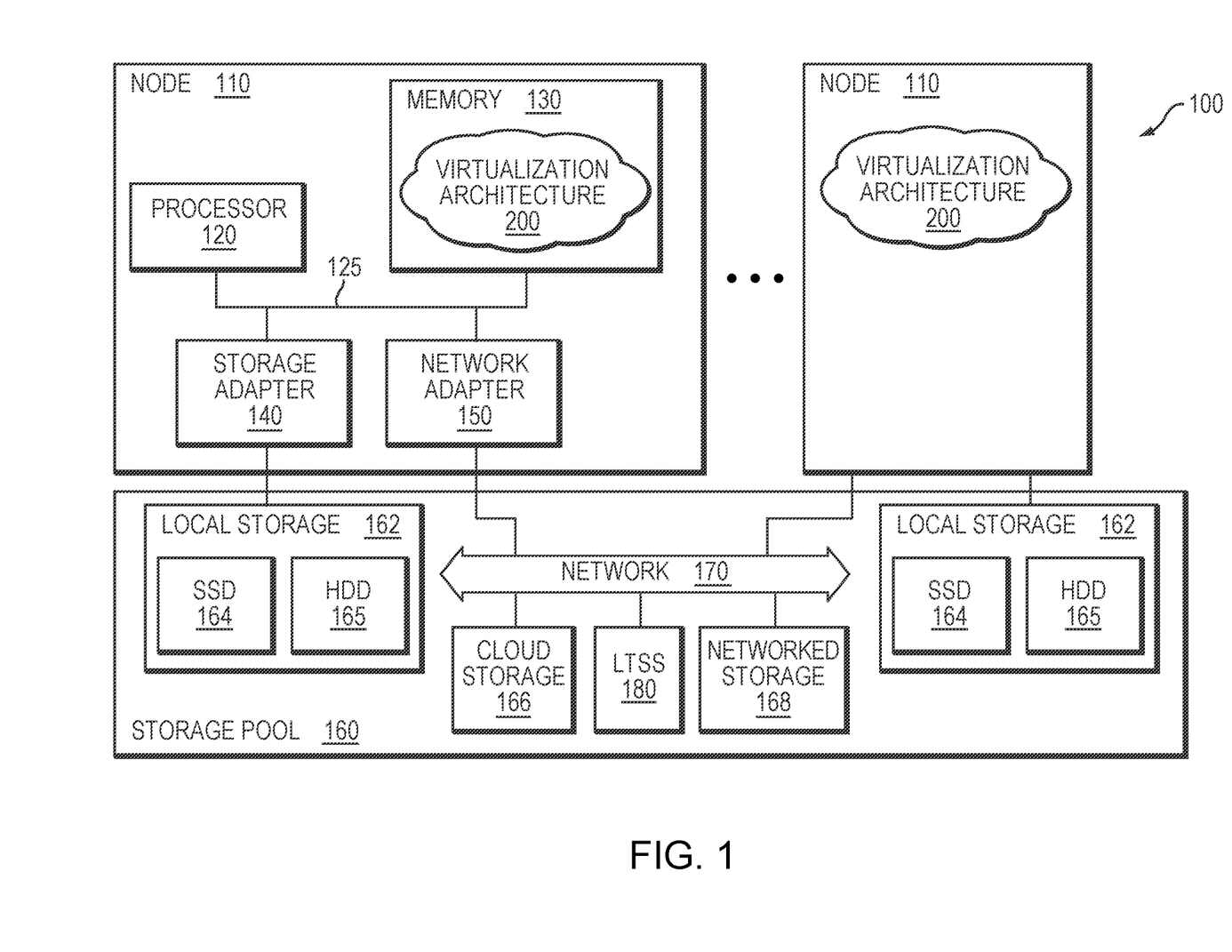
FIG. 1 is a block diagram of a plurality of nodes interconnected as a cluster in a virtualized environment.

FIG. 1 is a block diagram of a plurality of nodes 110 interconnected as a cluster 100 and configured to provide compute and storage services for information, i.e., data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster-wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over a network 170, which is illustratively an Ethernet local area network (LAN). The network adapter 150 may thus be embodied as a network interface card having the mechanical, electrical and signaling circuitry needed to connect the node 110 to the network 170. In an embodiment, one or more intermediate stations (e.g., a network switch, router, or virtual private network gateway) may interconnect the LAN with network segments organized as a wide area network (WAN) to enable communication between the nodes of cluster 100 and remote nodes of a remote cluster over the LAN and WAN (hereinafter "network") as described further herein. The multiple tiers of SOCS include storage that is accessible through the network, such as cloud storage 166 and/or networked storage 168, as well as the local storage 162 within or directly attached to the node 110 and managed as part of the storage pool 160 of storage objects, such as files and/or logical units (LUNs). The cloud and/or networked storage may be embodied as network attached storage (NAS) or storage area network (SAN) and include combinations of storage devices (e.g., SSDs and/or HDDs) from the storage pool 160. A long-term snapshot storage (LTSS 180) service of a backup (e.g., archival) storage system provides storage of large numbers (amounts) of point-in-time images or recovery points (i.e., snapshots) of application workloads on an object store, which may be part of cloud storage 166. Communication over the network may be affected by exchanging discrete frames or packets of data according to protocols, such as the Transmission Control Protocol/Internet Protocol (TCP/IP) and User Datagram Protocol (UDP), as well as protocols for authentication, such as the OpenID Connect (OIDC) protocol, and other protocols for secure transmission, such as the HyperText Transfer Protocol Secure (HTTPS) may also be advantageously employed.

The main memory 130 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool 160 as if they were writing to a SAN. The virtualization environment provided by the virtualization architecture 200 relocates data closer to the virtual machines consuming the data by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes and programs being embodied as logic, components, and/or modules consisting of hardware, software, firmware, or combinations thereof.

Figure 2:
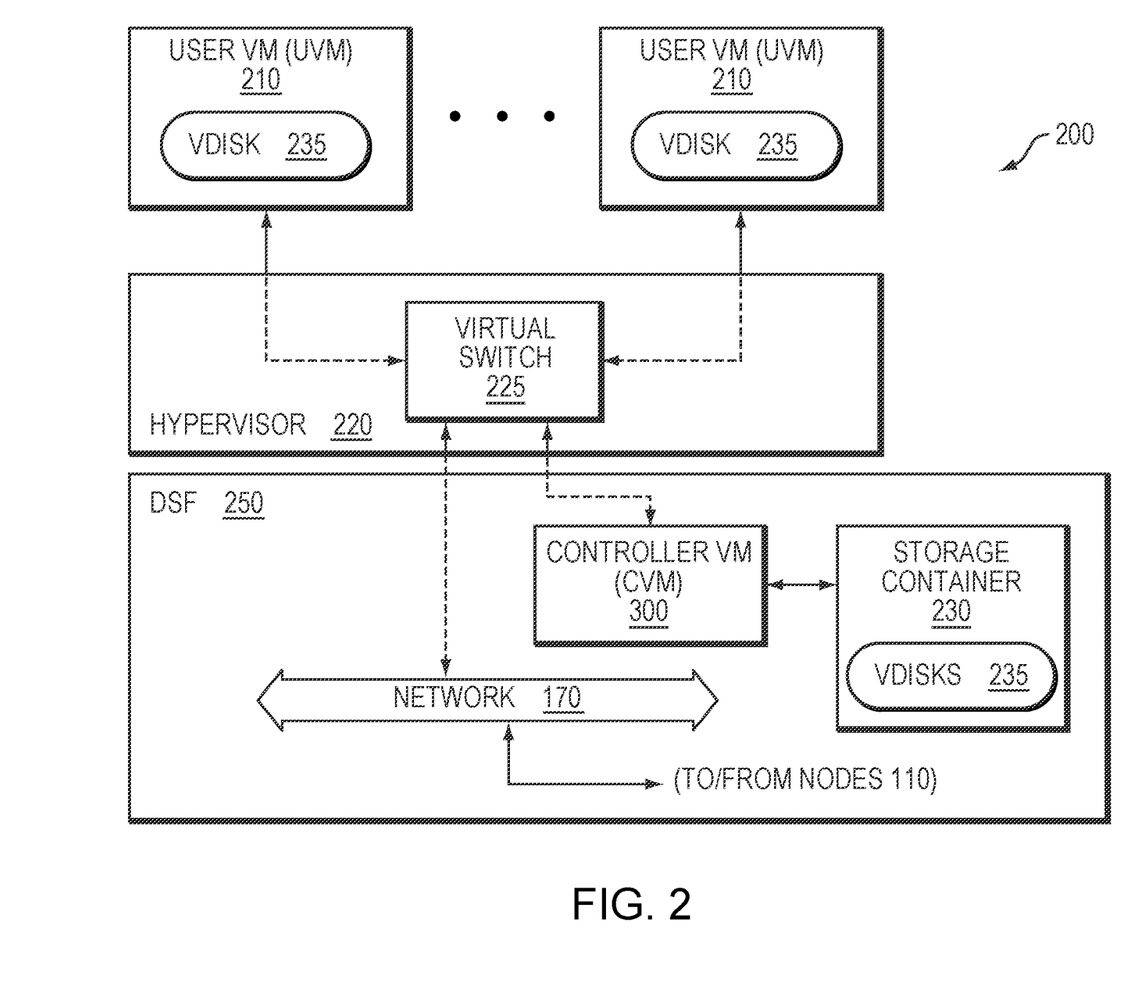
FIG. 2 is a block diagram of a virtualization architecture executing on a node to implement the virtualization environment.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and the UVMs 210. In an embodiment, the hypervisor 220 is illustratively the Nutanix Acropolis Hypervisor (AHV), although other types of hypervisors, such as the Xen hypervisor, Microsoft's Hyper-V, RedHat's KVM, and/or VMware's ESXi, may be used in accordance with the embodiments described herein.

Another software component running on each node 110 is a special virtual machine, called a controller virtual machine (CVM) 300, which functions as a virtual controller for SOCS. The CVMs 300 on the nodes 110 of the cluster 100 interact and cooperate to form a distributed system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the cluster. As such, the cluster operates as a hyper-convergence architecture wherein the nodes provide both storage and computational resources available cluster wide.

The client software (e.g., applications) running in the UVMs 210 may access the DSF 250 using filesystem protocols, such as the network file system (NFS) protocol, the common internet file system (CIFS) protocol and the internet small computer system interface (iSCSI) protocol. Operations on these filesystem protocols are interposed at the hypervisor 220 and redirected (via virtual switch 225) to the CVM 300, which exports one or more iSCSI. CIFS, or NFS targets organized from the storage objects in the storage pool 160 of DSF 250 to appear as disks to the UVMs 210. These targets are virtualized, e.g., by software running on the CVMs, and exported as virtual disks (vdisks) 235 to the UVMs 210. In some embodiments, the vdisk is exposed via iSCSI, CIFS or NFS and is mounted as a virtual disk on the UVM 210. User data (including the guest operating systems) in the UVMs 210 reside on the vdisks 235 and operations on the vdisks are mapped to physical storage devices (SSDs and/or HDDs) located in DSF 250 of the cluster 100.

In an embodiment, the virtual switch 225 may be employed to enable I/O accesses from a UVM 210 to a storage device via a CVM 300 on the same or different node 110. The UVM 210 may issue the I/O accesses as a SCSI protocol request to the storage device. Illustratively, the hypervisor 220 intercepts the SCSI request and converts it to an iSCSI. CIFS, or NFS request as part of its hardware emulation layer. As previously noted, a virtual SCSI disk attached to the UVM 210 may be embodied as either an iSCSI LUN or a file served by an NFS or CIFS server. An iSCSI initiator. SMB/CIFS or NFS client software may be employed to convert the SCSI-formatted UVM request into an appropriate iSCSI, CIFS or NFS formatted request that can be processed by the CVM 30). As used herein, the terms iSCSI, CIFS and NFS may be interchangeably used to refer to an IP-based storage protocol used to communicate between the hypervisor 220 and the CVM 30). This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 300 from which the UVM 210 desires I/O services. The IP-based storage protocol request may be sent from the UVM 210 to the virtual switch 225 within the hypervisor 220 configured to forward the request to a destination for servicing the request. If the request is intended to be processed by the CVM 300 within the same node as the UVM 210, then the IP-based storage protocol request is internally forwarded within the node to the CVM. The CVM 300 is configured and structured to properly interpret and process that request. Notably the IP-based storage protocol request packets may remain in the node 110 when the communication—the request and the response—begins and ends within the hypervisor 220. In other embodiments, the IP-based storage protocol request may be routed by the virtual switch 225 to a CVM 300 on another node of the same or different cluster for processing. Specifically, the IP-based storage protocol request may be forwarded by the virtual switch 225 to an intermediate station (not shown) for transmission over the network (e.g., WAN) to the other node. The virtual switch 225 within the hypervisor 220 on the other node then forwards the request to the CVM 300 on that node for further processing.

Figure 3:
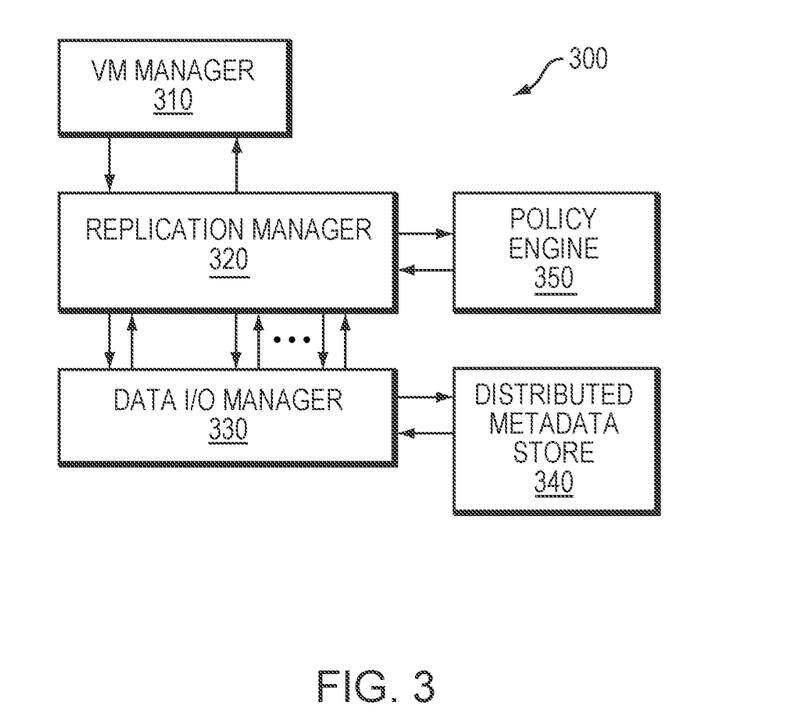
FIG. 3 is a block diagram of a controller virtual machine of the virtualization architecture.

FIG. 3 is a block diagram of the controller virtual machine (CVM) 300 of the virtualization architecture 200. In one or more embodiments, the CVM 300 runs an operating system (e.g., the Acropolis operating system) that is a variant of the Linux® operating system, although other operating systems may also be used in accordance with the embodiments described herein. The CVM 300 functions as a distributed storage controller to manage storage and I/O activities within DSF 250 of the cluster 100. Illustratively, the CVM 300 runs as a virtual machine above the hypervisor 220 on each node and cooperates with other CVMs in the cluster to form the distributed system that manages the storage resources of the cluster, including the local storage 162, the networked storage 168, and the cloud storage 166. Since the CVMs run as virtual machines above the hypervisors and, thus, can be used in conjunction with any hypervisor from any virtualization vendor, the virtualization architecture 200 can be used and implemented within any virtual machine architecture, allowing the CVM to be hypervisor agnostic. The CVM 300 may therefore be used in a variety of different operating environments due to the broad interoperability of the industry standard IP-based storage protocols (e.g., iSCSI, CIFS, and NFS) supported by the CVM.

Illustratively, the CVM 300 includes a plurality of processes embodied as services of a storage stack running in a user space of the operating system of the CVM to provide storage and I/O management services within DSF 250. The processes include a virtual machine (VM) manager 310 configured to manage creation, deletion, addition and removal of virtual machines (such as UVMs 210) on a node 110 of the cluster 100. For example, if a LVM fails or crashes, the VM manager 310 may spawn another UVM 210 on the node. A replication manager 320 is configured to provide replication and disaster recovery capabilities of DSF 250. Such capabilities include migration/failover of virtual machines and containers, as well as scheduling of snapshots. The replication manager 320 may interact with a policy engine 350 to initiate periodic snapshots, as described herein. A data I/O manager 330 is responsible for all data management and I/O operations in DSF 250 and provides a main interface to/from the hypervisor 220. e.g., via the IP-based storage protocols. Illustratively, the data I/O manager 330 presents a vdisk 235 to the UVM 210 in order to service I/O access requests by the UVM to the DFS. A distributed metadata store 340 stores and manages all metadata in the node/cluster, including metadata structures that store metadata used to locate (map) the actual content of vdisks on the storage devices of the cluster.

Data failover generally involves copying or replicating data among one or more nodes 110 of clusters 100 embodied as, e.g., datacenters to enable continued operation of data processing operations in a multi-site data replication environment, such as backup and disaster recovery. The multi-site data replication environment may include two or more datacenters, i.e., sites, which are typically geographically separated by relatively large distances and connected over a communication network, such as a WAN. For example, data at a local datacenter (primary site) may be replicated over the network to one or more remote datacenters (one or more secondary sites) located at geographically separated distances to ensure continuity of data processing operations in the event of a failure of the nodes at the primary site.

Synchronous replication may be used to replicate the data between the sites such that each update to the data at the primary site is copied to the secondary site. For instance, every update (e.g., write operation) issued by a UVM 210 to data designated for failover (i.e., failover data) is continuously replicated from the primary site to the secondary site before the write operation is acknowledged to the UVM. Thus, if the primary site fails, the secondary site has an exact (i.e., mirror copy) of the failover data at all times. Synchronous replication generally does not require the use of snapshots of the data; however, to establish a multi-site data replication environment or to facilitate recovery from, e.g., network outages in such an environment, a snapshot may be employed to establish a point-in-time reference from which the sites can (re)synchronize the failover data.

In the absence of continuous synchronous replication between the sites, the current state of the failover data at the secondary site always "lags behind" (is not synchronized with) that of the primary site resulting in possible data loss in the event of a failure of the primary site. If a specified amount of time lag in synchronization is tolerable (e.g., 60 mins), then asynchronous (incremental) replication may be selected between the sites, for example, a point-in-time image replication from the primary site to the secondary site is not more than 60 minutes behind. Incremental replication generally involves at least two point-in-time images or snapshots of the data to be replicated, e.g., a base snapshot that is used as a reference and a current snapshot that is used to identify incremental changes to the data since the base snapshot. To facilitate efficient incremental replication in a multi-site data protection environment, a base snapshot is required at each site. Note that the data may include an entire state of a virtual machine including associated storage objects.

Figure 4:
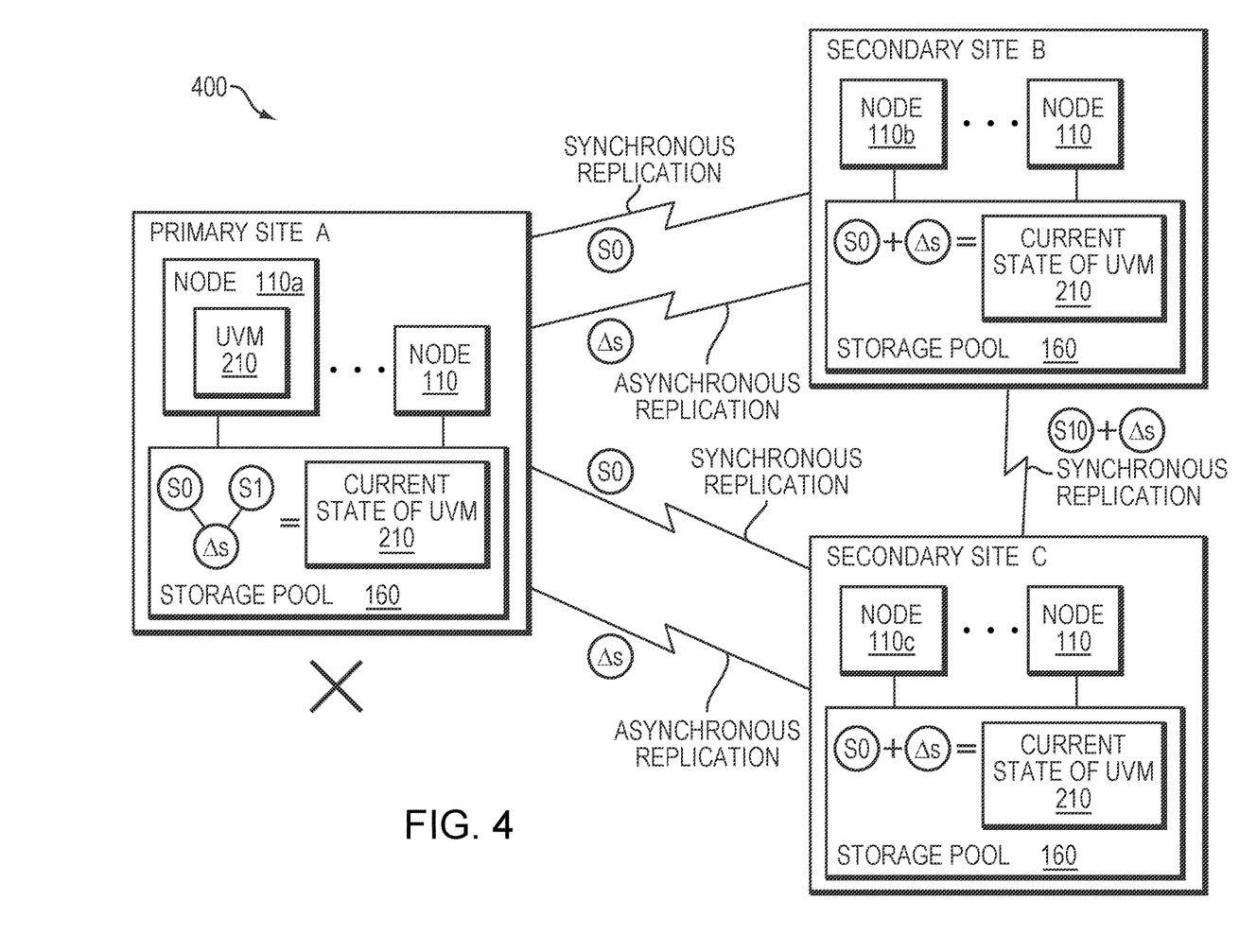
FIG. 4 is a block diagram of an exemplary multi-site data replication environment configured for use in various deployments such as for backup and/or disaster recovery (DR)

FIG. 4 is a block diagram of an exemplary multi-site data replication environment configured for use in various deployments, such as for backup and/or disaster recovery (DR). Illustratively, the multi-site environment 400 includes three sites: primary site A and secondary sites B and C, wherein one or more of the sites represent a datacenter embodied as a cluster 100 having one or more nodes 110. A category of data (e.g., one or more UVMs 210) running on primary node 110*a* at primary site A is designated for failover to secondary site B (e.g., secondary node 110*b*) or secondary site C (e.g., secondary node 110*c*) in the event of failure of primary site A. In an embodiment, the primary and secondary sites can be either on-premises (private) or cloud (public) sites. A first snapshot S0 of the data is generated at the primary site A and replicated (e.g., via synchronous replication) to secondary sites B and C as a base or "common" snapshot S0. A period of time later, a second snapshot S1 may be generated at primary site A to reflect a current state of the data (e.g., UVM 210). Since the common snapshot S0 exists at sites A-C, only incremental changes (deltas Δs) to the data designated for failover need be sent (e.g., via asynchronous replication) to sites B and C, which apply the deltas (Δs) to S0 so as to synchronize the state of the UVM 210 to the time of the snapshot S2 at the primary site.

A tolerance of how long before data loss will exceed what is acceptable, e.g., to a customer or administrator, determines (i.e., imposes) a frequency of snapshots and replication of deltas to failover sites, e.g., a data loss tolerance of 60 mins requires snapshots with commensurate delta replication every 60 mins (1 hour)—deemed a Recovery Point Objective (RPO) of 1 hour. Assume the customer provides a protection policy that specifies an amount of tolerable data loss applied to a category of data designated for failover from the primary site to the secondary sites. The protection policy is deployed among the sites and includes a schedule that defines the frequency at which snapshots are periodically generated and replicated as (i) mirroring references for synchronous replication or (ii) incremental changes/identifiers for asynchronous replication. Additionally, the schedule may define the number of snapshots needed to be retained to ensure availability of the latest common snapshot used as the recovery point at each site to satisfy RPO requirements.

For example, assume the protection policy schedule defines a frequency of snapshot generation and (asynchronous) replication of failover data (e.g., UVM 210) from site A to site B every hour (e.g., according to a 1 hour RPO) and retention of one snapshot as a reference, and replication of the UVM from site A to site C every 3 hours (e.g., according to a 3 hour RPO) and retention of one snapshot as a reference. Snapshots are thus generated and replicated for the <A,B> and <A,C> pairs according to the schedules below, wherein S[i] denotes a snapshot taken at hour i:

A→B: S0, S1, S2, S3, S4, S5, S6, S7, S8, S9, S10
A→C: S0, S3, S6, S9

To support further redundancy and cascading failure, if primary site A fails at hour 10 (as denoted by X), a failover operation of the data may be performed to secondary site B, which may now be designated as the new primary site of the failover data and secondary site C becomes the new secondary site in the event of failure to secondary (new primary) site B. However, site B has retained S10 as a reference, whereas site C has retained S9 as a reference; thus, sites B and C do not have a common snapshot reference. Accordingly, site B is forced to replicate (e.g., via synchronous replication) the common snapshot S10 and any applied deltas (Δs) to site C to reflect the current state (i.e., state at time of snapshot S10) of the UVM 210. Note that this problem arises in both a multi-site DR and cloud DR environment described herein.

The embodiments described herein are directed to a technique configured to provide network efficient data failover by explicitly protecting one or more common snapshot references at sites of a multi-site data replication environment to improve granularity of control of RPO for data across the sites. A common snapshot reference or recovery point (RP) is ensured (i.e., protected) so that, in the event of failure to a site, data designated for failover may be quickly protected by replicating only small incremental changes to the RP so as to maintain RPO requirements across the sites. In this manner, only a single snapshot need be retained and maintained at each of the multiple sites as the snapshot (i.e., RP) is marked as protected to prevent accidental removal or deletion. Illustratively to this end, the technique enhances a disaster recovery (DR) application programming interface (API) protocol through an extension that defines and applies a site ownership tag (i.e., additional metadata as a lock to control removal/deletion) to the RP (e.g., snapshot), wherein the tag enables protection and/or preservation of the RP that is ensured by enforcing adherence to the site ownership tag at the sites for the RP. The tag essentially functions as an advisory lock for the RP (e.g., a resource) that is shared among the sites to prevent deletion of the RP at the sites throughout the duration of the lock. As a result, the RP is retained and remains available at each site for failover to any other site.

In an embodiment, the technique leverages a well-defined, published API (i.e., publicly callable by other sites on the network) configured for use in the multi-site DR environment (e.g., a DR-API) to provide improved granularity of control over RPO requirements. Two use cases supported by the improved DR-API technique include cloud DR and multi-site DR, wherein a RP is retained among the multiple sites to reduce storage costs and recovery time. In an embodiment, the multiple sites include a primary site (e.g., "source" storage system embodied as an on-premises cluster), a secondary site (e.g., "target" storage system embodied as a cloud cluster) and an intermediary site (e.g., an "intermediary" storage repository) configured to provide a service (e.g., LTSS or similar backup service) running on a separate platform (e.g., another cloud) or co-located with the source or target. The source includes data to be replicated to the target and the intermediary steers/controls a replication. The data to be replicated on the source may be generated by taking a snapshot of an object, such as a VM or volume group (VG), running on the source. If the source or target exposes the DR-API, the intermediary uses the API during replication. Snapshots generated at the source may be replicated and stored at the intermediary to provide lower cost storage than the on-premises cluster.

The DR-API protocol defines operations between the source and target involving a RP, which is illustratively an abstract data type that defines how to encapsulate a snapshot of an object. In an embodiment, the object may be a running instance of a VM (e.g., UVM 210) whose state may be captured and replicated using the DR-API protocol. The RP is illustratively an immutable snapshot of the object and encapsulates metadata of the object (e.g., object ID, object creation time) as well as a configuration of the object (e.g., number of virtual CPUs, amount of memory) and a snapshot of the object data/disk storage at a point-in-time to form a single unit that may be used (in the future) for recovery or backup, i.e., the RP encapsulates the data and metadata of the object at the point in time. Illustratively, the DR-API protocol provides for invocation of (i) RP creation; (ii) RP replication between systems (sites); and RP recovery at a later time (in future); semantics of the protocol including APIs to, inter alia, (iv) create RP; (v) receive RP; (vi) delete RP; and (vii) list RP (i.e., show existing RPs).

The technique described herein extends and enhances the DR-API protocol through the provision of user-defined tags (tags) that may be associated with a RP (i.e., added as metadata of the RP) such as when, e.g., the source issues DR-API calls to replicate the RP. Notably, user-defined tags may be employed to define ownership and other attributes. In an embodiment, tags added to the RP indicate how the RP is to be handled or used at each of the sites by defining an ownership as permission for modification of the RP. For example, the technique extends the DR-API protocol to define semantics for specific tags (e.g., ownership tags that restrict modification of the associated RP to an owner site) to, e.g., preserve the RP. Essentially, the technique provides a sub-protocol extension to the DR-API protocol that further defines a meta-entity (i.e., the tag) describing how to enforce use of the RP associated with the tag, e.g., to preserve and maintain the RP as a common snapshot reference. Note that although the tag may be used in other ways to implement other high-level protocols, the technique described herein employs a particular instantiation of the tag as an owner specifying tag among other attributes to solve a multi-site common snapshot reference problem in an efficient manner.

Figure 5:
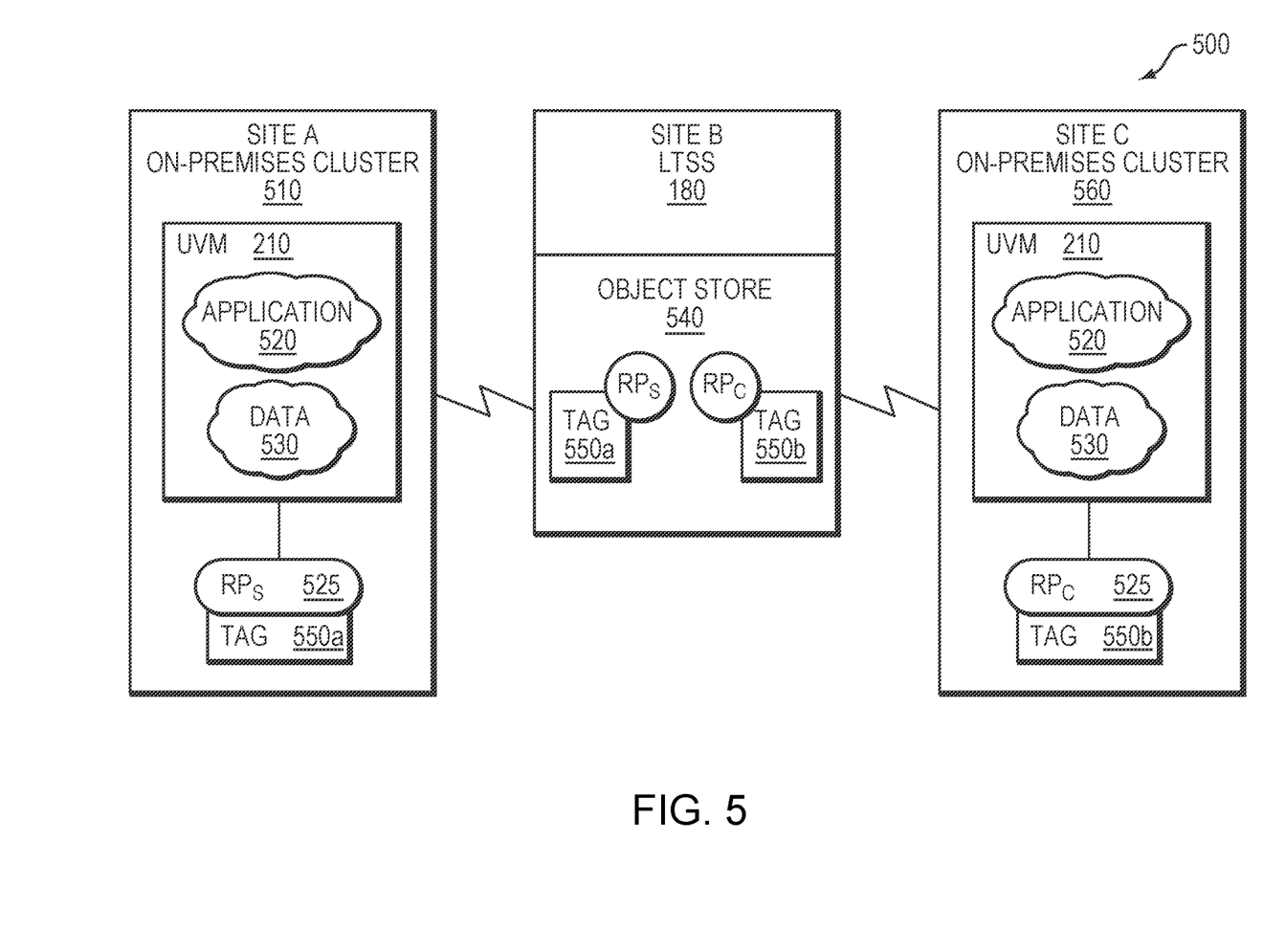
FIG. 5 is a block diagram illustrating an exemplary deployment of a tag associated with a recovery point in a DR environment.

FIG. 5 is block diagram illustrating an exemplary deployment of a tag associated with a recovery point (RP) in a DR environment. A customer application 520 running in a UVM 210 on site A (e.g., on-premises cluster 510) actively generates and replicates snapshots, including one or more RPs 525, e.g., RPs, of its application data to site B (e.g., LTSS 180 running in a public cloud service provider) for backup storage on an object store 540. As noted, the RP 525 contains the latest (newest) snapshot data that is backed up at the object store 540 and includes a tag 550a,b to ensure preservation of a common snapshot reference. The deployment 500 is cost effective because (i) storage on the object store 540 is cheaper (less expensive) than storage on the on-premises cluster 510; and (ii) LTSS 180 does not require any operational VMs and thus does not consume any compute resources needed to operate such VMs. During failover of the UVM running on the on-premises cluster 510 after a disaster, the cloud cluster 560 at site C is instantiated which, in turn, instantiates and recovers the UVM 210 from one or more snapshots stored in LTSS 180. The recovered UVM 210 executes the application 520 on the cloud cluster 560 and processes (mutates) data 530 that is then replicated as snapshots, including one or more RPs 525, e.g., RPc and its associated tag 550a,b, to LTSS 180 for backup storage at the object store 540. When the on-premises cluster 510 recovers, the application 520 and snapshots (e.g., RPs 525 and tag 550a,b) may be migrated back to the cluster 510 to reduce the customer's cost of operation.

The technique renders the transfer of data back and forth between the cloud and on-premises cluster (via LTSS) efficient by preserving commonality of snapshots across the sites. Further, the technique only requires that sites A and B or sites B and C be operational and actively running so that site A or C may communicate with site B (LTSS) to store and protect the RP 525. That is, once recovered from the disaster, site A or C can communicate with site B (LTSS) to obtain the RP 525. Illustratively, site A or C pushes/pulls (orchestrates) data transfers to/from LTSS, which is essentially a repository that organizes the snapshots for efficient storage/access from, e.g., object store 540. Site B is thus an intermediary repository (e.g., LTSS or other backup service) capable of storing a RP 525 (i.e., common snapshot reference), as well as identifying and enforcing an advisory locking capability (through the use of tags 550a,b acting as owner site tags that define which site should have permission to modify the RP) that prevents others (i.e., other sites) from deleting the RP 525 according to the extended DR-API protocol.

Figure 6:
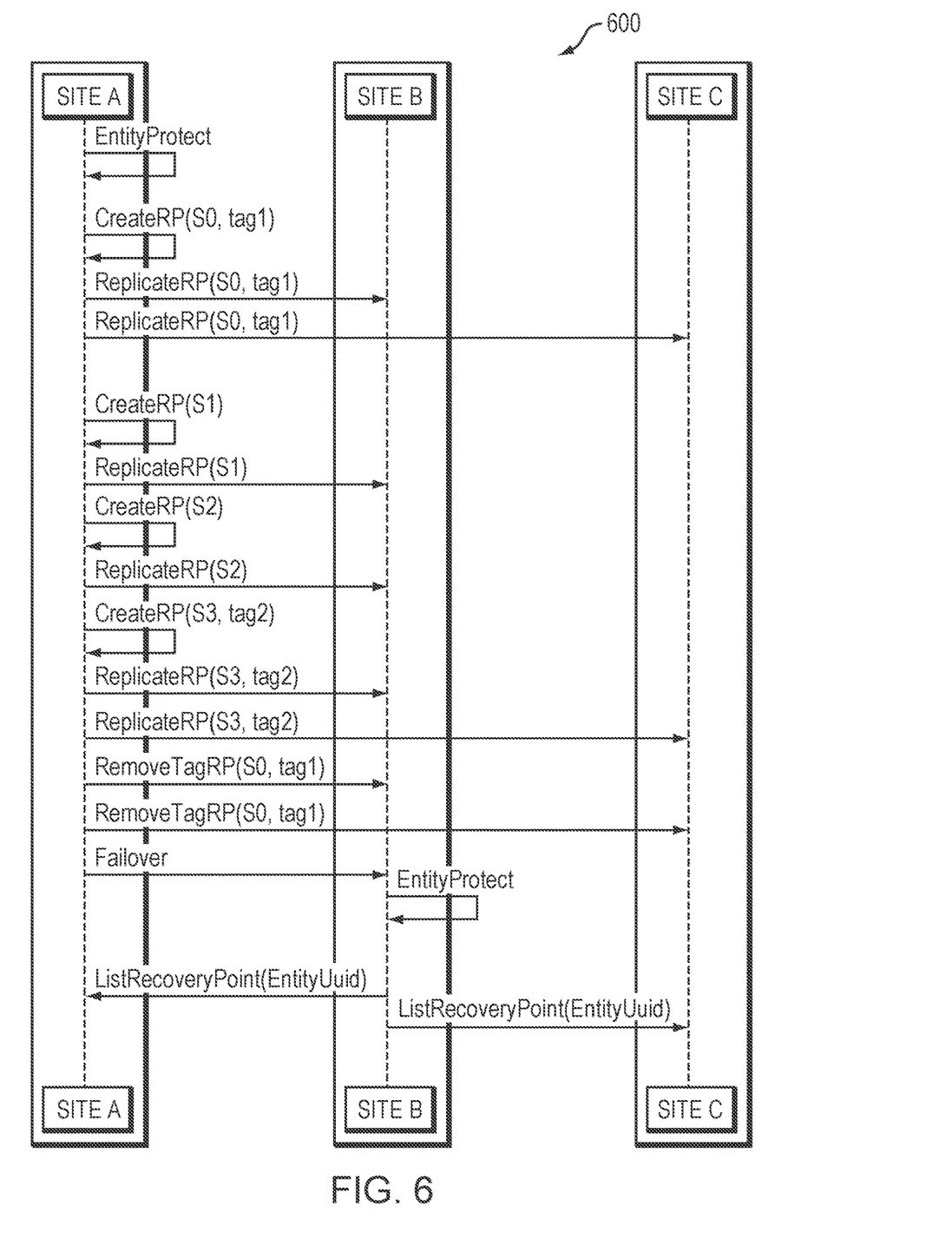
FIG. 6 is a diagram illustrating a DR-API protocol with tag extension.

FIG. 6 is diagram illustrating the DR-API protocol with tag extension. The extended DR-API protocol 600 may be embodied as software code running in, e.g., protocol stacks of the clusters 510, 560 and LTSS 180 for both multi-site DR and Cloud DR environments. In an embodiment, the policy engine 350 may cooperate with the replication manager 320 to initiate periodic snapshots of the object (e.g., UVM 210) according to a policy schedule configured to create RPs 525 of the UVM 210. The schedule may specify asynchronous replication of the UVM RPs from site A to site B every hour (e.g., according to a 1 hour RPO) and replication of the UVM RPs from site A to site C every 3 hours (e.g., according to a 3 hour RPO).

Illustratively, an RP 525 is created at a source (e.g., on-premises cluster 510 at site A) with an expiry time (e.g., a time at which the RP/snapshot expires) and subsequently replicated to a target (e.g., LTSS 180 at site B and/or cloud cluster 560 at site C). In an embodiment, the target may automatically establish a tag 550a,b for the RP 525 in response to receiving the replicated RP. However, in an illustrative embodiment, the tag 550a,b may be explicitly established (set) by the source (e.g., site A) when the RP 525 is created and subsequently replicated to the target (e.g., sites B and C). For example, site A creates RP 525 as snapshot S0 with tag 1, e.g., CreateRP (S0, tag1) that indicates site A has ownership (and thus exclusive modification permission) of the RP when replicated at the other sites; thereafter site A replicates the RP 525, e.g., ReplicateRP (S0, tag1) now marked/tagged as owned by site A to sites B and C. Enforcement of modification permission to the RP 525 using the tag (i.e., site ownership "tag 1") is implemented at each of the sites, so that site B or C may not modify the ReplicateRP marked with "tag1". Similarly, sites A and C may not modify a snapshot marked with, e.g., "tag 2" associated with ownership by site B. Notably, the tag may include other attributes in addition to the ownership site, such as a label, e.g., "tag 1", used for identification.

The tags 550a,b as an owner site tag may effectively be used as a preservation or protection "lock" for the RP 525 that prevents the RP from being deleted even if its expiry time has expired, i.e., the tag 550a,b overrides any expiry requirement for the RP/snapshot, because a non-owner site may not modify (i.e., delete or expire) the RP. Note that by default, the target examines the expiry time for a snapshot, such as RP 525, and deletes or garbage collects (GC) the snapshot upon expiration. However, the technique provides an effective advisory locking capability/feature of the tag 550a,b that prevents deletion/GC of the RP 525 despite expiration as specified by the expiry time. Notably, prior solutions either extended expiry times of snapshots or set retention times such that the snapshots never expired while needed, but then remained longer than desired. In an embodiment, expiry is still established by the customer/administrator and the technique overrides the expiry time by attaching a tag 550a,b to the RP 525 that prevents GC.

When the RP 525 is no longer needed, the source or owner of the tag 550a,b may explicitly request/instruct the target to remove the tag (e.g., "tag 1" indicating site A as owner) from the RP 525, which may occur in response to the source establishing a new, latest RP as the common reference snapshot and, thus, permit removal of modification restrictions on the older RP 525 so that it may be GC if needed. For example, the site A creates a latest RP 525 as snapshot S3 with tag 2, e.g., CreateRP (S3, tag2) and replicates the RP 525, e.g., ReplicateRP (S3, tag2), to sites B and C. Site A then instructs sites B and C to remove tag 1 from snapshot S0 in accordance with an exemplary instruction to remove, e.g., RemoveTagRP (S0, tag1), thus allowing sites B and C to modify S0. Note that the source may keep both S0 and S3 as RPs 525 with tags 550a,b thereby preventing GC. When the tag 550a,b is removed, the snapshot/RP assumes its original expiry time as restriction to modification is removed at sites B and C.

The extended DR-API protocol 600 of FIG. 6 is illustratively directed to a multi-site DR environment where site B is the LTSS repository (intermediary system), site A is the on-premises cluster (primary site), and site C is the cloud cluster (secondary site). Notably, site A is aware of both sites B and C. However, also referring to FIG. 5, the tag extension to the DR-API protocol 600 may also apply to a Cloud DR environment where site A is initially only aware of site B, which is used for backup storage of replicated snapshots as an intermediary repository. Here, the source (site A) creates/establishes the RPs and sets its tag 550a as owner to effectively lock the RP according to its preference (i.e., prevent changes to the RP replicated at the other sites). When site A fails and site C is instantiated for failover, site C pulls the replicated snapshot data (RPs) from site B and may establish its tag 550b as owner for a different RP, e.g., RPc, according to its preference or requirements (i.e., site A is owner of RPs and site C is owner of RPc). Thus, the technique allows different policies and schedules for establishing RPs 525 at sites A and C. Illustratively, sites A and C are active sites that issue commands/instructions and site B is a "server" that responds/processes those commands/instructions. That is, site B is a repository or intermediary configured to store replicated snapshots (RPs 525) and their tags 550a,b for long-term snapshot storage.

Advantageously, the DR-API technique substantially reduces/limits the number of snapshots retained at each site (e.g., from a prior solution) to establish a RP, particularly when the secondary site is a cluster instantiated in a public cloud service provider (CSP). Limiting retention of snapshots avoids consuming more hardware and software resources than required, since the CSP resources are tied to a "pay as use" cost basis. Prior solutions typically relied on a retention schedule of at least a number of snapshots as part of a protection policy that was shared among the sites, so that there is always a common snapshot reference available as a RP. The technique described herein does not rely on the property that the protection policy schedule be shared among the sites. Instead, the technique employs an extension to the DR-API protocol that provides an effective advisory locking capability using site ownership tags for a replicated resource (e.g., the RP) among the sites that prevents deletion of the resource. Moreover, the technique facilitates agreement among the sites as to what constitutes a common snapshot reference and further preserves that common snapshot reference as a recovery point (RP).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or electronic memory) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A non-transitory computer readable medium including program instructions for execution on a processor, the program instructions configured to:
create a first recovery point (RP) for failover data to retain a first common snapshot across nodes of a multi-site disaster recovery (DR) environment according to a recovery point objective (RPO) of failover data at each site indicating an expiry time of the first RP;
lock the first RP using a first tag to preserve and maintain the first RP throughout a duration of the locking; and
replicate the first RP with the first tag from a first site to one or more other sites of the DR environment, wherein the one or more other sites enforce the locking of the first RP based on the first tag.

2. The non-transitory computer readable medium of claim 1, wherein the program instructions for execution on the processor are further configured to:
create a second RP for the failover data at each site to retain a second common snapshot according to a respective RPO, wherein the second RP is locked using a second tag;
replicate the second RP with the second tag from the first site to the one or more other sites, wherein the one or more other sites enforce the locking of the second RP based on the second tag; and
instruct the one or more other sites to remove the first tag from the first RP, wherein the first RP is removed according to a respective expiry time.

3. The non-transitory computer readable medium of claim 2, wherein a second site of the one or more other sites of the DR environment receiving the first and second RPs is a cloud storage site.

4. The non-transitory computer readable medium of claim 1, wherein the first tag indicates the first site is owner of the first RP.

5. The non-transitory computer readable medium of claim 1, wherein the program instructions for execution on the processor are further configured to replicate the first RP with the first tag from the first site to a second site and further replicate the first RP with the first tag from the second site to a third site.

6. The non-transitory computer readable medium of the claim 1, wherein the program instructions to replicate the first RP uses an application programming interface (API) published by the one or more other sites to invoke the replication.

7. The non-transitory computer readable medium of claim 1, wherein replication of the failover data at each site is initiated periodically according to a policy schedule based on a respective RPO.

8. The non-transitory computer readable medium of claim 1, wherein the first site and a second site periodically replicate RPs to a cloud site of the DR environment, wherein the second site is a failover site for the first site.

9. The non-transitory computer readable medium of claim 1, wherein a first RPO of the failover data from the first site to a second site is different from a second RPO of the failover data from the second site to a third site.

10. A method comprising:
creating a first recovery point (RP) for failover data to retain a first common snapshot across nodes of a multi-site disaster recovery (DR) environment according to a recovery point objective (RPO) of failover data at each site indicating an expiry time of the first RP;
locking the first RP using a first tag to preserve and maintain the first RP throughout a duration of the locking; and
replicating the first RP with the first tag from a first site to one or more other sites of the DR environment, wherein the one or more other sites enforce the locking of the first RP based on the first tag.

11. The method of claim 10 further comprising:
creating a second RP for the failover data at each site to retain a second common snapshot according to a respective RPO, wherein the second RP is locked using a second tag;
replicating the second RP with the second tag from the first site to the one or more other sites, wherein the one or more other sites enforce the locking of the second RP based on the second tag; and
instructing the one or more other sites to remove the first tag from the first RP, wherein the first RP is removed according to a respective expiry time.

12. The method of claim 11, wherein a second site of the one or more other sites of the DR environment receiving the first and second RPs is a cloud storage site.

13. The method of claim 10, wherein the first tag indicates the first site is owner of the first RP.

14. The method of claim 10 further comprising:
replicating the first RP with the first tag from the first site to a second site and further replicating the first RP with the first tag from the second site to a third site.

15. The method of claim 10, wherein replicating the first RP comprises using an application programming interface (API) published by the one or more other sites to invoke the replication.

16. The method of claim 10, wherein replication of the failover data at each site is initiated periodically according to a policy schedule based on a respective RPO.

17. The method of claim 10, wherein the first site and a second site periodically replicate RPs to a cloud site of the DR environment, wherein the second site is a failover site for the first site.

18. The method of claim 10, wherein a first RPO of the failover data from the first site to a second site is different from a second RPO of the failover data from the second site to a third site.

19. An apparatus comprising:
a network of interconnected nodes of a multi-site disaster recovery (DR) environment, the network including a first node having a processor configured to execute program instructions to:
create a first recovery point (RP) for failover data to retain a first common snapshot across the nodes of the multi-site DR environment according to a recovery point objective (RPO) of failover data at each site indicating an expiry time of the first RP;
lock the first RP using a first tag to preserve and maintain the first RP throughout a duration of the locking; and
replicate the first RP with the first tag from the first site to one or more other sites of the DR environment, wherein the one or more other sites enforce the locking of the first RP based on the first tag.

20. The apparatus of claim 19, wherein the program instructions for execution on the processor are further configured to:
create a second RP for the failover data at each site to retain a second common snapshot according to a respective RPO, wherein the second RP is locked using a second tag;
replicate the second RP with the second tag from the first site to the one or more other sites, wherein the one or more other sites enforce the locking of the second RP based on the second tag; and
instruct the one or more other sites to remove the first tag from the first RP, wherein the first RP is removed according to a respective expiry time.

21. The apparatus of claim 20, wherein a second site of the one or more other sites of the DR environment receiving the first and second RPs is a cloud storage site.

22. The apparatus of claim 19, wherein the first tag indicates the first site is owner of the first RP.

23. The apparatus of claim 19, wherein the program instructions for execution on the processor are further configured to replicate the first RP with the first tag from the first site to a second site and further replicate the first RP with the first tag from the second site to a third site.

24. The apparatus of claim 19, wherein the program instructions to replicate the first RP uses an application programming interface (API) published by the one or more other sites to invoke the replication.

25. The apparatus of claim 19, wherein replication of the failover data at each site is initiated periodically according to a policy schedule based on a respective RPO.

26. The apparatus of claim 19, wherein the first site and a second site periodically replicate RPs to a cloud site of the DR environment, wherein the second site is a failover site for the first site.

27. The apparatus of claim 19, wherein a first RPO of the failover data from the first site to a second site is different from a second RPO of the failover data from the second site to a third site.

* * * * *